(12) United States Patent
Britton et al.

(10) Patent No.: US 8,251,457 B2
(45) Date of Patent: Aug. 28, 2012

(54) CHILD RESTRAINT SAFETY DEVICE

(75) Inventors: Daniel W. Britton, Calgary (CA);
Andreas Gehlen, Cologne (DE)

(73) Assignee: Thule Child Transport Systems Ltd., Vancouver (CA)

( * ) Notice: Subject to any disclaimer, the term of this patent is extended or adjusted under 35 U.S.C. 154(b) by 227 days.

(21) Appl. No.: 12/553,925

(22) Filed: Sep. 3, 2009

(65) Prior Publication Data
US 2010/0244517 A1 Sep. 30, 2010

(51) Int. Cl.
*A47D 15/00* (2006.01)

(52) U.S. Cl. ............... 297/467; 297/464; 297/219.12; 297/220; 297/219.1; 297/230.12 A

(58) Field of Classification Search ............ 297/219.12, 297/220, 219.1, 230.1, 230.12, 230.13, 230.14, 297/464–467
See application file for complete search history.

(56) References Cited

U.S. PATENT DOCUMENTS

| | | | |
|---|---|---|---|
| 2,829,702 A | 4/1958 | Keating | |
| 3,578,380 A | 5/1971 | Jacobus | |
| 3,747,955 A | 7/1973 | MacAlpine | |
| 4,037,764 A * | 7/1977 | Almosnino et al. | 224/160 |
| 4,050,737 A * | 9/1977 | Jordan | 297/465 |
| 4,093,307 A * | 6/1978 | McLennan | 297/485 |
| 4,157,839 A * | 6/1979 | Lahti et al. | 280/642 |
| 4,324,430 A | 4/1982 | Dimas et al. | |
| 4,440,443 A * | 4/1984 | Nordskog | 297/397 |
| 4,655,502 A | 4/1987 | Houllis | |
| 4,666,207 A | 5/1987 | Quartano | |
| 4,674,800 A * | 6/1987 | Ensign | 297/465 |
| 4,729,571 A | 3/1988 | Tienstra | |
| 4,729,572 A | 3/1988 | Bergeron | |
| 4,750,783 A | 6/1988 | Irby et al. | |
| 4,759,588 A * | 7/1988 | Husnik | 297/468 |
| 4,824,168 A | 4/1989 | Makoski | |
| 4,834,403 A | 5/1989 | Yanus et al. | |
| 4,834,459 A * | 5/1989 | Leach | 297/467 |
| 5,020,814 A | 6/1991 | George et al. | |
| 5,076,264 A * | 12/1991 | Lonardo et al. | 602/19 |
| 5,076,599 A | 12/1991 | Lockett et al. | |
| 5,137,335 A * | 8/1992 | Marten | 297/485 |
| 5,219,203 A | 6/1993 | Switlik | |
| 5,238,293 A | 8/1993 | Gibson | |
| 5,243,724 A * | 9/1993 | Barnes | 5/482 |
| 5,261,683 A | 11/1993 | Kurdziel | |
| 5,292,142 A | 3/1994 | Vitarelli | |
| 5,460,395 A | 10/1995 | Chen | |
| 5,468,020 A * | 11/1995 | Scime | 280/808 |
| 5,573,410 A | 11/1996 | Stepniak | |
| 5,641,200 A | 6/1997 | Howell | |
| 5,781,946 A * | 7/1998 | McEntire et al. | 5/482 |
| 5,785,333 A | 7/1998 | Hinkston et al. | |

(Continued)

FOREIGN PATENT DOCUMENTS

DE 207434 8/1907

(Continued)

*Primary Examiner* — Laurie Cranmer
(74) *Attorney, Agent, or Firm* — Christensen O'Connor Johnson Kindness PLLC

(57) ABSTRACT

An apparatus for securing the head and/or torso of a child by way of a belt securing system is provided. Adjustable head and torso supporting portions can be attached to the seat of a lightweight vehicle, such as a bike trailer, or an airplane.

21 Claims, 3 Drawing Sheets

U.S. PATENT DOCUMENTS

| | | | |
|---|---|---|---|
| 5,829,835 A | 11/1998 | Rogers et al. | |
| 5,846,093 A | 12/1998 | Muench, Jr. | |
| 5,915,789 A * | 6/1999 | Ponce De Leon, III | 297/484 |
| 5,918,933 A * | 7/1999 | Hutchinson et al. | 297/219.12 |
| 5,921,571 A | 7/1999 | Bell | |
| 5,934,757 A | 8/1999 | Smith | |
| 5,950,261 A * | 9/1999 | Hay et al. | 5/482 |
| 5,954,404 A | 9/1999 | Suzuki | |
| 5,957,537 A * | 9/1999 | Hoolahan | 297/464 |
| 5,967,606 A | 10/1999 | Bergh et al. | |
| 5,979,921 A | 11/1999 | Derven et al. | |
| 5,984,332 A | 11/1999 | Beaudoin et al. | |
| 6,053,518 A | 4/2000 | Chiu | |
| 6,053,580 A * | 4/2000 | White, Sr. | 297/467 |
| 6,195,572 B1 | 2/2001 | Patterson et al. | |
| 6,332,785 B1 | 12/2001 | Muench, Jr. | |
| 6,338,637 B1 | 1/2002 | Muench, Jr. | |
| 6,449,770 B1 * | 9/2002 | Taylor et al. | 2/69 |
| 6,489,554 B1 | 12/2002 | Bertini | |
| 6,494,532 B1 * | 12/2002 | Brosnan et al. | 297/181 |
| 6,517,366 B2 | 2/2003 | Bertini | |
| 6,601,916 B1 * | 8/2003 | Kamiki | 297/250.1 |
| 6,705,628 B2 | 3/2004 | Kahmann | |
| 6,764,134 B1 * | 7/2004 | Crescenzi et al. | 297/219.12 |
| 6,811,418 B2 | 11/2004 | Jazowski | |
| 6,843,685 B1 | 1/2005 | Borgstrom | |
| 6,935,685 B2 * | 8/2005 | Kassai et al. | 297/219.1 |
| 6,959,938 B1 | 11/2005 | Liu | |
| 7,052,085 B2 | 5/2006 | Hoey-Slocombe et al. | |
| 7,086,703 B1 * | 8/2006 | Jones | 297/488 |
| 7,237,848 B1 * | 7/2007 | Story et al. | 297/485 |
| 7,251,846 B1 * | 8/2007 | Elkin et al. | 5/655 |
| 7,431,324 B2 | 10/2008 | Britton et al. | |
| 7,654,613 B2 * | 2/2010 | Bass | 297/250.1 |
| 7,878,587 B1 * | 2/2011 | Leach | 297/219.12 |
| 7,926,881 B1 * | 4/2011 | Youreman | 297/464 |
| 2006/0138826 A1 * | 6/2006 | Caton et al. | 297/256.16 |

FOREIGN PATENT DOCUMENTS

| | | |
|---|---|---|
| DE | 320587 | 12/1915 |
| DE | 382776 | 12/1921 |
| DE | 7711961 | 11/1977 |
| DE | 92 15 797.1 | 4/1993 |
| DE | 4303719 A1 | 8/1994 |
| DE | 201 07 010 U1 | 8/2001 |
| EP | 0339890 A2 | 11/1989 |
| EP | 0422812 A1 | 4/1991 |
| FR | 2701655 A1 | 8/1994 |
| GB | 175742 A | 2/1922 |
| GB | 2165443 A | 4/1986 |
| WO | 01/89907 A1 | 11/2001 |

* cited by examiner

CHILD RESTRAINT SAFETY DEVICE

FIELD

The present invention generally relates to a safety device apparatus for transporting a child; specifically, the apparatus can support the torso and possibly also the head of the child by way of a belt securing system.

BACKGROUND

When transporting children in motorised or unmotorised vehicles, seats are used which have a belt securing system ensuring that the child does not fall out and is not thrown out of its seat particularly in the event of an accident.

For passenger cars, child seats of various sizes are offered which are positioned in a seat of the passenger car and secured therein. Thus, seats are available which fit children of different sizes and in which children are adequately braced against jolts which occur during a journey and at the same time are effectively protected by the belt system of the child seat. Child seats for passenger cars are for the most part based on an independent heavy construction. Very few of them can be used in other vehicles due to their weight and/or size.

With bike trailers, as an example of lightweight vehicles for transporting children, it is possible to achieve speeds of up to 50 km/h. The danger potential is considerable for a child transported in such a vehicle and becomes all the greater the less effectively the child is secured in the seat. This applies all the more if the child falls asleep and sinks down in the seat due to a lack of body tension, i.e. the child does not stay in a position which is optimum for safeguarding and support.

The seats of a large number of bike trailers and strollers for children are formed by one or more textile webs which are clamped into the frame construction of the vehicle. The size of the seats (or also of double seats for two-seater bike trailers or strollers) is predetermined in each case by the frame construction, i.e. is not variable. There is often no classification of bike trailers according to age group or size of child; they are generally intended for children up to an age of approximately five. Although the seats in bike trailers are designed for children, they are often too large particularly for transporting small children, so that the transport of children that are smaller such as infants and toddlers, for example with ages of six months to two years, in bike trailers can sometimes be a problem. However, most suitably sized child seats for passenger cars cannot be reasonably used in a bike trailer, because the seats of bike trailers are not suitable for accommodating such child seats. The same applies accordingly to strollers.

The size of a seat in an airplane cannot be readily configured to be variable and passenger car child seats are generally unsuitable for use in airplane seats. Likewise, therefore, airplane seats may sometimes leave children not braced adequately.

SUMMARY

In accordance with a broad aspect of the present invention there is provided a safety device for transporting a child in a vehicle seat, the vehicle seat comprising a belt securing system with at least two belts, the safety device comprising: a central supporting portion including a pair of side edges; a first flexible supporting portion adjoining the central supporting portion and extending from one of the side edges; a second flexible supporting portion adjoining the central supporting portion and extending from another of the side edges; and a belt guide on each flexible supporting portion formed for guiding at least one of the belts of the belt securing system along an outer facing surface of the flexible supporting portion; the first and the second flexible supporting portions together with the belts guided thereon being capable of supporting an area of the body of the child sitting in the seat.

In accordance with another broad aspect of the present invention there is provided a child carrier comprising: a seat including a sitting area and a back rest, a belt securing system including at least two belts and a safety device, the safety device comprising: a central supporting portion including a pair of side edges; a first flexible supporting portion adjoining the central supporting portion and extending from one of the side edges; a second flexible supporting portion adjoining the central supporting portion and extending from another of the side edges; and a belt guide on each flexible supporting portion, the belt guide formed for guiding at least one of the at least two belts along an outer facing surface of the flexible supporting portion and the safety device positioned in the seat with the central supporting portion positioned against the backrest and the at least two belts guided by the belt guides of the first and the second flexible supporting portions.

It is to be understood that other aspects of the present invention will become readily apparent to those skilled in the art from the following detailed description, wherein various embodiments of the invention are shown and described by way of illustration. As will be realized, the invention is capable for other and different embodiments and its several details are capable of modification in various other respects, all without departing from the spirit and scope of the present invention. Accordingly the drawings and detailed description are to be regarded as illustrative in nature and not as restrictive.

BROAD DESCRIPTION

A safety device apparatus for transporting a child and to support the torso and possibly also the head of the child sitting in a seat may include a central supporting portion as well as flexible supporting portions which adjoin the central supporting portion at the sides and belt guides on the side supporting portions. The flexible supporting portions together with the belts guided thereon are capable of supporting an area of the body of the child sitting in the seat.

The basic concept is that the safety device is to be used as an addition/insert for a seat and in so doing, a belt securing system existing in the seat can be used for positioning the safety device. The safety device is configured such that when it is inserted into the seat and coupled with the belt securing system, it is able to support an area of the child's body. The immediate supporting effect is then produced, as will be explained in detail in the following, by a cooperation between the safety device and the belts of the belt securing system, it being possible for part of the safety device to be positioned between the belt and the body of the child, but this does not have to be the case.

In one embodiment, the safety device includes a torso support and may be configured to cooperate with two lap belts of a belt securing system. The torso support may include: a back portion, being provided as a central supporting portion; at least two side portions, being provided as flexible supporting portions which are capable of wrapping around and encompassing, at least in part, a torso area of the child; and lap belt guides being provided on the sides, remote from the child, of the side portions.

To use this torso support, the lap belts are drawn into the lap belt guides on the side portions and the torso support is positioned with its back portion against the backrest of the seat. After the child has been positioned in the seat, the side portions are placed around the torso of the child and the lap belts are done up and pulled tight. In this way, the size of a seat and the volume encircled by a lap belt relative to the seat can easily be adapted to the size of a child. The size is adapted in that the torso of the child is at least partly, possibly, completely tightly enclosed by the back portion and the side portions of the torso support. Thus, a support is possible for a child in a seat which seat is otherwise arguably too big per se for the child.

The torso support may provide an improved support for the child if it has fallen asleep in the seat, since it is held by the torso support in a position which allows for support and securing in the seat in spite of the child lacking body tension.

In order to further improve the supporting effect of the torso support, at least the side portions may be at least partly wider than the lap belts. In one embodiment, for example, at least part of the side portions is at least double the width of the lap belts.

In another configuration of a torso support, a crotch portion may adjoin the back portion which, when the torso support is used, is guided from the back portion between the legs of the child to enclose the child's crotch. Consequently, the child can be secured against twisting in the seat, for example.

A crotch portion of this type may be particularly suitable in cooperation with a crotch belt of a belt securing system. Therefore, elements can preferably be provided for guiding a crotch belt on the side remote from the child of the crotch portion.

The side portions and/or the crotch portion of the torso support according to the invention are preferably configured in the manner of flaps and become narrower in particular towards their free ends, remote from their connection to the back portion. The effect of the narrower ends of the side portions is that the child is slightly more mobile in its upper body region and sitting comfort is improved.

The two side portions can be attached onto the back portion such that they can be easily pivoted, i.e., without involving a considerable amount of force, with respect to the back portion particularly in the region of the attachment. For example, in one embodiment, the torso support may be formed of materials capable of being joined by sewing and the seams formed by sewing may provide a region suited for pivotal movement. The side portions may further be selected to have a degree of flexibility along their length, such that they can be wrapped about the torso of a child, and able to accommodate children of variable girths.

The crotch support may be flexible at least at its end and along its length such that it can be wrapped up between the legs of a child and, again, able to accommodate children of various sizes.

In one embodiment, the thicknesses of the side portions and of the crotch portion may be substantially the same.

Belt guides may be provided on the torso support to guide and retain the belts of the seat's belt securing system. The belt guides may be operable to guide the belt through or along the surface of the torso support for at least some length out of contact with the child. For example, in one embodiment, the belt guides retain the belts to extend along an outer facing side of the torso support remote from the child. In one embodiment for example, belt guides may be provided by at least one loop on the side portions. The loops may be positioned on the side of the side portions remote from the child. For example, each side portion may be considered to include an inner facing side, directed toward the space formed by the torso support to accommodate the child and an outer facing side, directed away from the space to be accommodated by the child and which will be visible when the torso support is in use. Stated another way, then, the loops may be secured on the outer facing side of the side portions. The loops may extend substantially transversely to the longitudinal direction of each side portion. In addition, at least one loop can be provided as a guide element on the crotch portion for guiding the crotch belt on the side, remote from the child, of the crotch portion. Again, the at least one loop may be arranged to extend substantially transversely to the longitudinal direction of the crotch portion. In each case, the at least one loop may be arranged near the free end of the side and crotch portions.

To improve the guidance of the lap belts, in each case at least one further loop can be provided on the side, remote from the child, of each side portion. This further loop may be positioned closer to the back portion than the first loop (i.e. on the side portion between the side portion's connection to the back portion and the loop adjacent the free end of the side portion). For simplicity, the loops may be considered to include a front loop, the one adjacent the free end, and a rear loop, the one closer to the back portion. The rear loop may possibly be positioned in a lower region on its side portion and may extend with its length offset at an angle from the length of the front loop, with the distance between the upper ends of the loops greater than that between the lower ends of the loops. For example, the further loop may be angled approximately 45° to the lateral edge of the back portion. In principle, the loops may have a length extending at a right angle to the direction in which a belt is to be guided therethrough.

As an alternative to loops, T-groove shaped guides or channels, for example, can also be provided to extend along the side and/or crotch supports in the direction of the desired belt path. Alternately or in addition, slots may be employed as belt guides, which slots extend substantially transversely to the lengths of side and/or crotch portions or the path of the belts. Slots can be formed for example in the core material of the flexible supporting portions and/or can be made in a sheath/upper material surrounding the core material, in which case two slots made in the sheath or upper material and extending substantially parallel to one another have the same function as a loop.

Another configuration of the safety device may cooperate at least with two shoulder belts of a belt securing system. In one embodiment, the safety device may include a head support. The head support may include; a back of the head portion, provided as the central supporting member; and two cheek portions, provided as flexible supporting portions which are attached obliquely or transversely to the back of the head portion and protrude forwardly thereof. The cheek portions may be capable of laterally supporting the child's head. The head support may include belt guides for guiding the shoulder belts along it. In one embodiment, for example, belt guides are positioned on the cheek portions to guide the shoulder belts along the undersides of the cheek portions.

To use the head support, the shoulder belts are guided through the belt guides on the undersides of the cheek portions and the head support is positioned against the backrest of the seat such that the head support is positioned on the upper ends of the shoulder belts. When a child is put into the seat equipped in this manner and when the shoulder belts of the belt securing system are done up and pulled tight, the head support is always arranged above the child's shoulders, such that the cheek portions are located on the side of the child's head. This means that the head is supported laterally which is advantageous not only if the child falls asleep and its head lolls to the side, but also makes it possible, depending on the inherent rigidity of the head support, for lateral impacts occurring in an accident to be absorbed.

While the torso support may include flexible side portions extending laterally from the central back portion that are flexible enough to be easily able to adapt to the circumferential contour of a child's torso, the cheek portions of the head support may be flexible and resilient that they yield within specific limits to pressure from the head which they support, but nevertheless provide a sufficient supporting action also and especially in the event of an accident in which the head can undergo a considerable lateral acceleration. It is precisely in an accident that the head support can serve as an impact protection with respect to frame parts or other hard parts in the immediate vicinity of the seat.

In this connection, the head supporting device can have reinforcements by which the cheek portions are supported and stabilised with respect to the back of the head portion.

In the case of the head supporting device as well, the belt guides can be formed by loops which are arranged on the underside of the cheek portions transversely to the shoulder belt which is to be guided in each case. If the loops on the undersides of the cheek portions are narrow enough to fix the head support on the shoulder belts by the friction between the loops and the shoulder belts without the head support immediately slipping again, a particularly simple handling of the head support is possible.

As an alternative to loops, in the case of the head supporting device as well it is possible for T-groove shaped guides or slots, for example, to be made as belt guides in the undersides of the cheek portions.

The handling of the safety device in general and of the torso support and the head support in particular can be simplified by at least one connector on the central supporting portion for securing the central supporting portion to the vehicle seat. The connector may facilitate positioning of the safety device, stabilize the safety device while a child is being positioned therein and permit height adjustment of the safety device in the seat. The connector may operate by one portion on the device cooperating with another connector portion on the seat. An example of such a connector may be for example, a hook and loop (i.e. Velcro®) fastener, the portions of which can be arranged on the back of the central portion and also at a suitable height on the backrest of the seat. However, for example the connector can also take other forms such as, for example, a loop that it is capable of cooperating with one or more belts on the backrest of the seat, a fastener one part of which can be secured to the seat back and another part of which may be secured to the safety device.

In particular, one or more loops on the upper edge of the central supporting portion may be considered for this purpose. The loops used for the safety device according to the invention may be formed from a textile belt material and can be joined to the safety device, for example by at least one of its ends via a Velcro® fastener and/or can be secured undetachably, in particular sewn or bonded, to the safety device by at least one of its ends.

In order to improve the comfort of the safety device for the child, the central supporting portion and/or the flexible supporting portions can be at least partly cushioned. Particularly in the case of the cheek portions, a cushioning of the sides facing the child can also serve to absorb impacts in an accident.

In a further embodiment, the central supporting portion of the safety device may be substantially rectangular, in particular square, such that an effective rearwards supporting surface is provided.

In a further embodiment, the torso support and the head support of the invention can be joined together, for example by a fastener. However, they can also form as a unitary member, i.e., they can be configured as one piece. Particularly for an embodiment of this type, it can be advantageous for the central supporting portion to be configured so that it is at least partly fixed, in which case the head support is then held on the fixed part of the central supporting portion. The fixed part of the central supporting portion can also be further developed such that the head support or at least the cheek portions is/are attached thereto in a height adjustable manner.

DESCRIPTION OF THE DRAWINGS

A further, detailed, description of the invention, briefly described above, will follow by reference to the following drawings of specific embodiments of the invention. These drawings depict only typical embodiments of the invention and are therefore not to be considered limiting of its scope. In the drawings.

DETAILED DESCRIPTION

The detailed description set forth below in connection with the appended drawings is intended as a description of the present invention and is not intended to represent the only embodiments contemplated by the inventor. The detailed description includes specific details for the purposes of providing a comprehensive understanding of the present invention. However, it will be apparent to those skilled in the art that the present invention may be practiced without these specific details.

Figure 1:
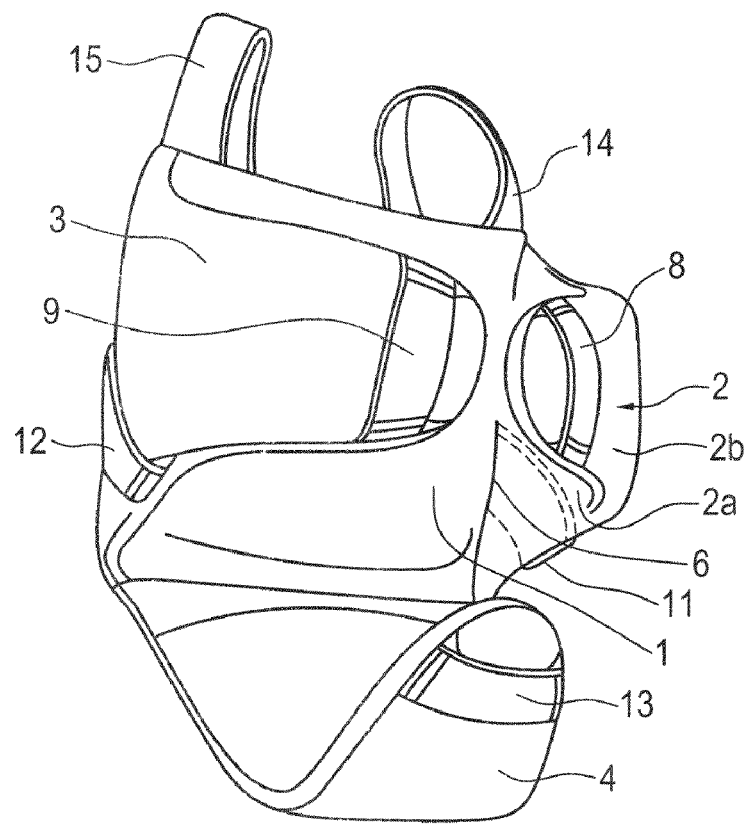
FIG. 1 is a front, side perspective view of a torso support.
Figure 2:
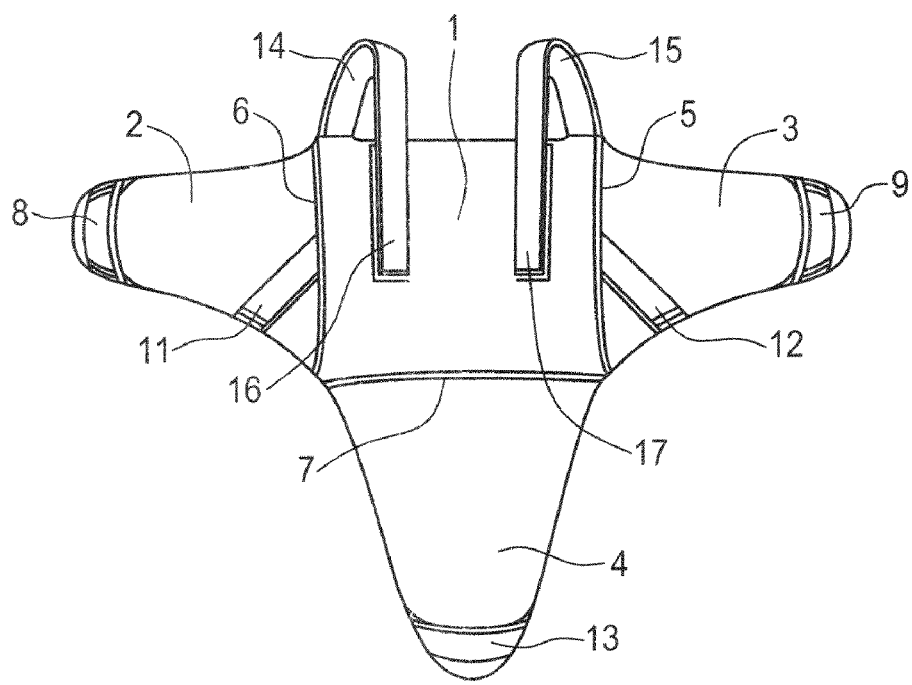
FIG. 2 is a rear, plan view of the torso support of FIG. 1.
Figure 3:
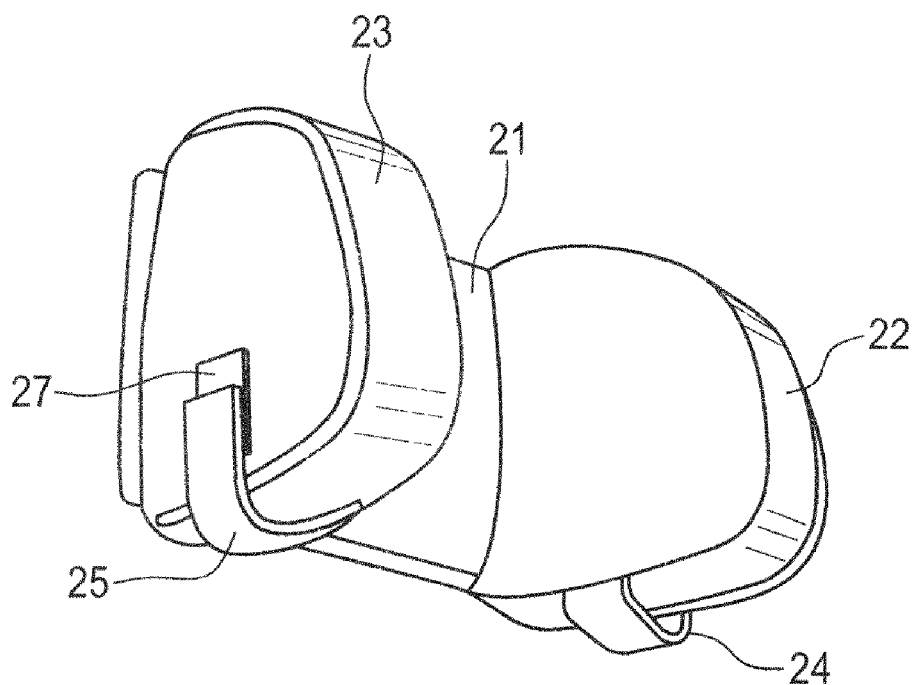
FIG. 3 is a front, side perspective view of a head support.

The torso support shown in FIGS. 1, 2 and 3 includes a back portion 1, side portions 2, 3 joined to the back portion 1, one 2 on the right-hand side and the other 3 on the left-hand side thereof, and a crotch portion 4 adjoining the lower side of the back portion 1. The back portion 1 may assume the form of a panel having a height and width greater than its thickness and may be in the form of a quadrangle such as a rectangle or square. The side portions 2, 3 each adjoin the lateral side edge of the back portion 1, are configured as flaps and taper in width towards their free ends. In one embodiment, the side portions are significantly tapered in the first third of their length which adjoins the back portion 1.

Crotch portion 4 is configured as a flap and adjoins the lower edge of the back portion 1. As shown, crotch portion may have a width that tapers towards its free end and, for example, may be tapered over its entire length from its adjoining end to its free end.

Together the torso support forms a T-shaped member when laid flat with the side portions extending laterally on each side from the back portion and the crotch member extending down. Each of these portions 2, 3, 4 are flexible and pivotable relative to the back portion such that they can be bent around to overly the back portion.

The width of the back portion 1 and the length of the side portions 2, 3 are selected in combination such that the side portions 2, 3 are substantially able to completely enclose the torso of a child. The ends of side portions 2, 3 which adjoin the back portion are wider in each case compared to the rest of the side portions and permit a good lateral hold of a child, while the relatively narrow free ends allow the child a certain freedom of movement.

The length of the crotch portion and the extent of the width over the length are selected such that the crotch portion can be easily guided from the back portion between the legs of a child and can substantially completely enclose the crotch of the child.

The individual supporting portions 1, 2, 3, 4 of the torso support each, in one embodiment; include a flexible, sheet-like material. Adjoining edges 5, 6, 7 between the abutting supporting portions 1, 2, 3, 4, are selected to facilitate bending. For example, adjoining edges 5, 6, 7 can be thinned, as by over-edging in these areas, such that supporting portions 1, 2, 3, 4 can be easily bent with respect to one another at these points. The foamed material is flexible, but has sufficient dimensional stability such that it can adapt to the shape of a child's body under the effect of external forces, but substantially assumes its original substantially planar shape again in the absence of external forces.

Flexible, sheet-like materials may include foamed materials, leather, textiles and also contained gels. In one embodiment, the flexible sheet-like materials may include a core material which is sheathed by a textile. Depending on the material, of course, a sheath may not be necessary.

By nature of the use and configuration, each of the individual supporting portions 1, 2, 3, 4, of the torso support will include an inner facing side and an outer facing side. For example, side portion 2 includes an inner facing side 2a and an outer facing side 2b. Each of flap-like portions 2, 3, 4 also may be considered to have a length defined between adjoining edges 5, 6, 7 and their free ends.

On the outer facing sides of side portions 2, 3 in the region of their free ends are loops 8, 9. Front loops 8, 9 extend to form slots thereunder that extend substantially transverse to the length of the side portions. Front loops 8, 9 in this embodiment are made of a belt material and extend over the entire width of the side portions. Furthermore, outer facing sides of the side portions 2, 3 also, in this embodiment, include a further loop 11, 12 positioned between loops 8, 9 and portion 1. Rear loops 11, 12 are also made of a belt material, but extend from the lower lateral edge of the respective side portion up to the adjoining edge 6, 7 of the back portion 1 and side portion 2, 3 and runs at an angle of approximately 45° to the respective adjoining edge 6, 7. A loop 13 made of a belt material is also attached onto the outer facing side of the crotch portion 4 in the region of its free end. Loop 13 extends to form slots thereunder that extend substantially transverse to the length of the crotch portions. The widths of the loops 11, 12, 13 are approximately the same. The loops can be secured to the device in various ways, as by polymer welding, sewing, etc.

Torso support further includes, in this embodiment, belts 14, 15 spaced apart and secured to the upper edge of back portion 1. Belts 14, 15 each have an end secured to the upper edge of the rear portion 1 and a free end releasably securable, as by use of a fastener 16, 17 to outer facing side of the back portion. Fastener 16, 17 may take various forms such as hook and loop fasteners (Velcro®) or otherwise. The belts 14, 15 can be used to form loops, as shown, to attach the back portion to a vehicle seat, for example in eyelets or safety belts provided for this purpose, or for example to join the torso support to a head support.

Figure 4:
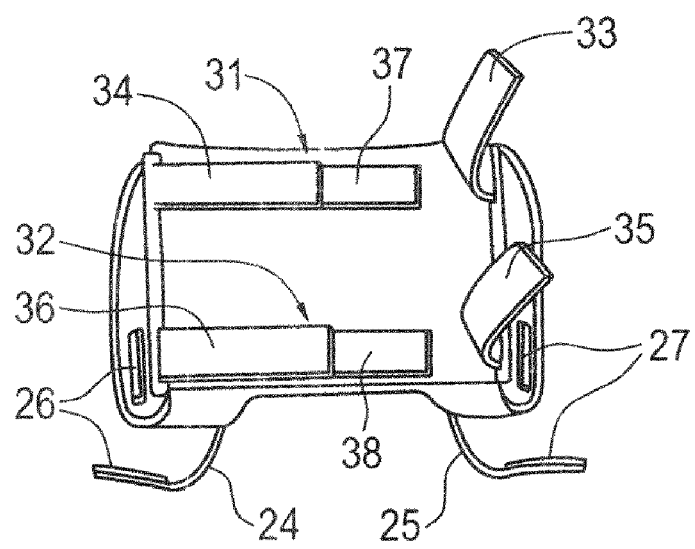
FIG. 4 is a rear view of the head support of FIG. 3.

The head support shown in FIGS. 3 and 4 includes a back of the head portion 21 onto which are positioned two cheek portions 22, 23. The cheek portions 22, 23 are spaced apart and protrude from the back of head portion to form a U-shaped member in top view. In the illustrated embodiment, the cheek portions converge on the inner facing sides with the back of the head portion at an angle of approximately 100° and the protruding length of the cheek portions (distance from back of the head portion to opposite free end) almost corresponds to the clear distance of the two cheek portions 22, 23 on the back of the head portion 21, the cheek portions being configured slightly longer on their underside than on their upper side and thus their front end face extends obliquely.

The back of head portion is substantially planar having a height and width greater than its thickness. In one embodiment, the back of head portion includes a core material which is thin and relatively rigid, made, for example, of a plastics material, foamed material, etc., onto which a light cushioning material can be supported. Cushioning material may include a foamed material, gel, fibers, etc. and may be positioned in the region between the cheek portions.

The cheek portions may be formed of a somewhat flexible material such as a thick, flexible foamed material. The head support may further include reinforcements for supporting the cheek portions with respect to the back of the head portion. Further, the cheek portions may be arranged to be adjustable in height.

The head support including the back of head portion and cheek portions may be sheathed with textiles, cushioning, etc.

In the illustrated embodiment, there is provided, on the underside of each cheek portion 22, 23, a respective loop formed by a belt 24, 25. Each belt may be secured at one of its ends to the inner lower edge of the respective cheek portion 22, 23 and may be releasably secured at its other, free end to the outside of the respective cheek portion 22, 23 by a fastener 26, 27, such as of hook/loop type. The head support can be fitted by these belts 22, 23 to the shoulder belts of a belt securing system of a seat.

In addition or alternately, two superimposed pairs of loops 31, 32 may be provided for securing the head support on a seat. Loops 31, 32 which run transversely are provided on the rear side of the back of the head portion 21. They are formed by belts 33, 34, 35, 36 which are secured down on the lateral outer edges of the back of the head portion 21 and the free ends of which are secured by a Velcro® fastener 37, 38 in the central region of the back of the head portion. These loops are provided for securing the head support at a suitable height on vertical belts on the backrest of a seat.

Figure 5:
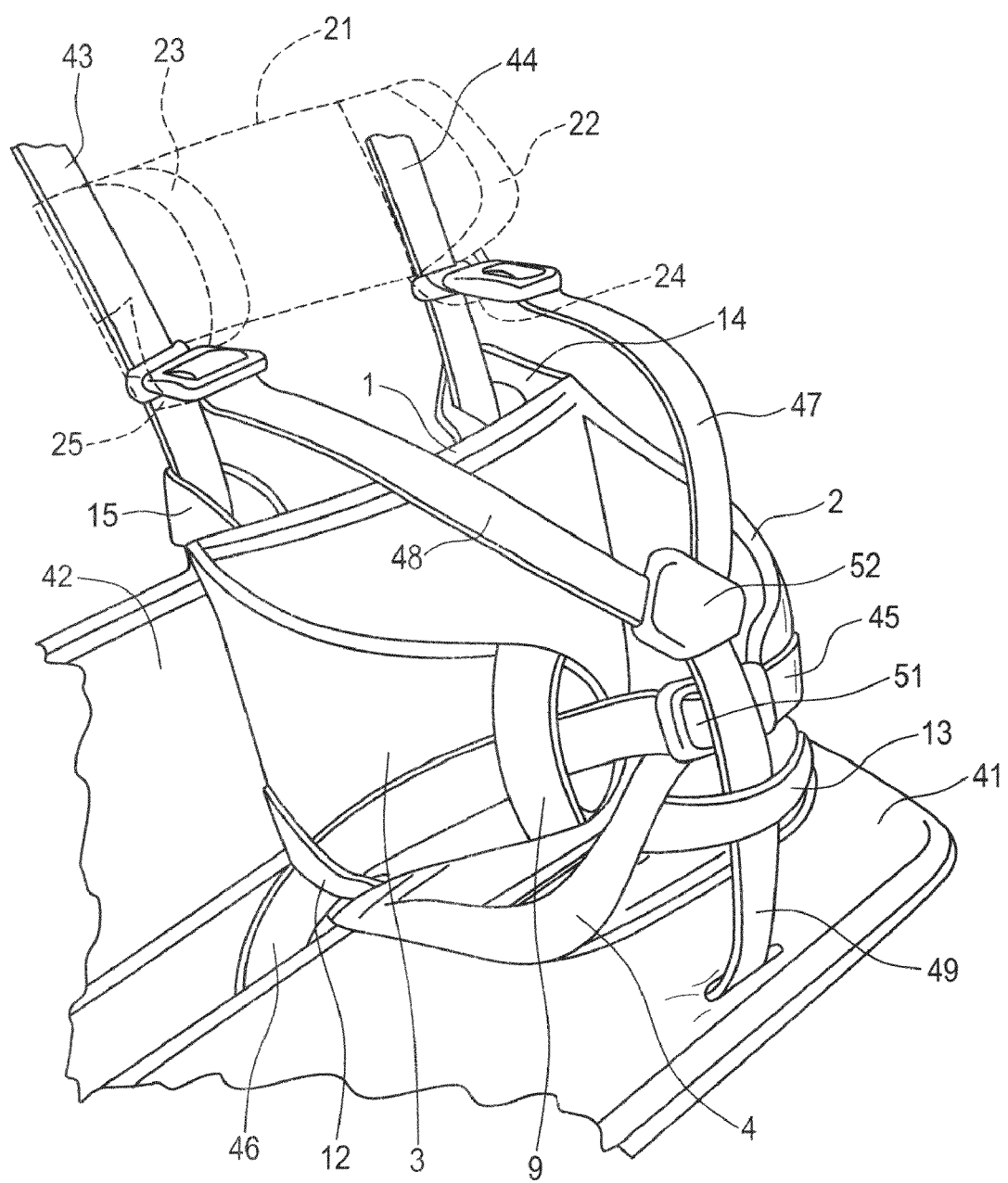
FIG. 5 is a front, side perspective view of a torso support introduced into a seat.

FIG. 5 shows how the torso support of FIGS. 1 and 2 can be introduced into a seat of a child carrier which has a belt system. The illustrated seat is that of a bike trailer. The seat has a sitting surface 41, a backrest 42 and two mutually parallel, substantially vertical tension belts 43, 44 above the backrest. Arranged on the seat is a belt securing system with two lap belts 45, 46, two shoulder belts 47, 48 and a crotch belt 49, it being possible for the lap belts 45, 46 to be connected together by a first belt buckle 51 and for the shoulder belts 47, 48 to be connected to the crotch belt 49 by a second belt buckle 52. The lap belts 45, 46 are guided through the loops 8, 9, 11, 12 on the rear sides of the lap portions 2, 3 and the crotch belt 49 is guided through the loop 13 on the rear side of the crotch portion 4. When the belts are done up, the torso support forms an insert between the belts and the child with the area between the inner facing surfaces of the torso support forming a child occupant area smaller than the child occupant area formed by the seat and belts. The torso support rests closer against the child's torso as the belts of the belt securing system are tightened. Thus, a child can be held safely in the belt securing system even if the seat and belt securing system without the torso support form an occupant area larger than the size of the child.

FIG. 5 also shows how the head support of FIGS. 3 and 4 can be introduced into a seat of a child carrier. In particular, straps 24, 25 can be looped and secured around shoulder belts 47, 48 to rest above the torso support. Straps 31, 32 can be positioned about tension belts 43, 44 to secure the head support adjacent the backrest. Being slidably secured through straps 31, 32, the head support can be height adjusted by moving along belts 43, 44, possibly as pulled along by shoulder belts 47, 48 or apart from belts.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are know or later come to be known to those of ordinary skill in the art are intended to be encompassed by the elements of the claims. Moreover, nothing disclosed herein is intended to be dedicated to the public regardless of whether such disclosure is explicitly recited in the claims. No claim element is to be construed under the provisions of 35 USC 112, sixth paragraph, unless the element is expressly recited using the phrase "means for" or "step for".

We claim:

1. A safety device for transporting a child in a vehicle seat, the vehicle seat comprising a belt securing system with at least two belts and a crotch belt, the safety device comprising:
   (a) a central, back supporting portion including a pair of side edges;
   (b) first flexible supporting portion adjoining the back supporting portion and extending from one of the side edges to a free end portion;
   (c) a second flexible supporting portion adjoining the back supporting portion and extending from another of the side edges to a free end portion;
   (d) a belt guide adjoining the free end portion of each flexible supporting portion formed for guiding at least one of the belts of the belt securing system along an outer facing surface of the flexible supporting portions;
   (e) a crotch portion adjoining the back supporting portion between the first and second flexible supporting portions;
   (f) at least one crotch belt guide on the crotch portion for guiding the crotch belt of the belt securing system;
   (g) wherein the first and the second flexible supporting portions and the crotch portion together with the belts guided thereon being capable of supporting the lap and crotch areas of the body of the child sitting in the seat;
   (h) wherein the belt securing system has at least two shoulder belts;
   (i) further comprising a head support portion having a back of head portion;
   (j) first and second flexible cheek portions, the cheek portions protruding from the back of head portion, being capable of laterally supporting the child's head, and having undersides; and
   (k) a shoulder belt guide provided on each of the undersides of the cheek portions to guide the shoulder belts.

2. The safety device according to claim 1, wherein the belt securing system has at least two lap belts; and the first and the second flexible supporting portions are formed to encompass the lap area of the child sitting in the seat, and the belt guides are formed as lap belt guides.

3. The safety device according to claim 2, wherein the first and the second flexible supporting portions are pivotable with respect to the back portion.

4. The safety device according to claim 2, wherein at least a portion of the first and second flexible supporting portions has a width wider than the width of the at least two lap belts.

5. The safety device according to claim 1, wherein the first and the second flexible supporting portions taper in width towards their free ends along a majority of the lengths with the flexible supporting portions.

6. The safety device according to claim 1, wherein the first flexible supporting portion comprises a second belt guide positioned on the first flexible supporting portion between the belt guide and the back supporting portion.

7. The safety device according to claim 1, wherein the belt guide on the first flexible supporting portion is formed as a slot arranged substantially transversely to the length of the first flexible supporting portion.

8. The safety device according to claim 1, wherein the belt guide is formed as a loop arranged substantially transversely to the length of the first flexible supporting portion and the loop is secured on an outer facing side of the first flexible supporting portion.

9. The safety device according to claim 1, wherein the crotch belt guide is formed as a slot arranged substantially transversely to the length of the crotch portion.

10. The safety device according to claim 1, wherein the crotch belt guide is formed as a loop as the at least one crotch belt guide arranged substantially transverse to the length of the crotch portion and the loop is secured on the outer facing side of the crotch portion.

11. The safety device according to claim 1, wherein the crotch portions includes a free end opposite its adjoining end and the at least one crotch belt guide is arranged close to the free end of the crotch portion.

12. The safety device according to claim 1, wherein each shoulder belt guide on the underside of the cheek portions is formed by at least one loop.

13. The safety device according to claim 1, further comprising at least one fastening element on the back of head portion for fastening the back supporting portion to the seat.

14. The safety device according to claim 13, wherein the at least one fastening element on the back of head portion is capable of cooperating with at least one fastening on the seat for adjusting the height of the head support portion in the seat.

15. The safety device according to claim 13, wherein the at least one fastening element is a loop on the upper edge of the back of head portion.

16. The safety device according to claim 1, wherein the back supporting portion is partly formed from a substantially rigid material.

17. A safety device for transporting a child in a vehicle seat, the vehicle seat comprising, a belt securing system with at least two belts and a crotch belt, the safety device comprising:
   (a) a central, back supporting portion including a pair of side edges;
   (b) first flexible supporting portion adjoining the back supporting portion and extending from one of the side edges to a free end portion;
   (c) a second flexible supporting portion adjoining the back supporting portion and extending from another of the side edges to a free end portion;

(d) a belt guide adjoining the free end portion of each flexible supporting portion formed for guiding at least one of the belts of the belt securing system along an outer facing surface of the flexible supporting portions;

(e) a crotch portion adjoining the back supporting portion between the first and second flexible supporting portions;

(f) at least one crotch belt guide on the crotch portion for guiding a crotch belt of the belt securing system;

(g) wherein the first and the second flexible supporting portions and the crotch portion together with the belts guided thereon being capable of supporting the lap and crotch areas of the body of the child sitting in the seat;

(h) wherein the belt securing system has at least two lap belts; and the first and the second flexible supporting portions are formed to encompass the lap area of the child sitting in the seat, and the belt guides are formed as lap belt guides; and (i) further comprising a head support positioned atop the back portion, the head support including a back of head portion and cheek portions protruding from the back of the head portion being capable of laterally supporting the child's head, and having undersides, and shoulder belt guides provided on the undersides of the cheek portions.

18. The safety device according to claim 17, wherein the back portion and the back of the head portion are height adjustable relative to one another.

19. A child carrier comprising: a seat including a sitting area and a back rest, a belt securing system including at least two belts and a crotch belt, and a safety device, the safety device comprising:

a central, back supporting portion including a pair of side edges;

a first flexible supporting portion adjoining the back supporting portion and extending from one of the side edges of the back supporting portion;

a second flexible supporting portion adjoining the back supporting portion and extending from another of the side edges of the back supporting portion;

a belt guide on each flexible supporting portion, the belt guide formed for guiding at least one of the at least two belts along an outer facing surface of the flexible supporting portion and the safety device positioned in the seat with the back supporting portion positioned against the backrest and the at least two belts guided by the belt guides of the first and the second flexible supporting portions;

a crotch portion adjoining the back supporting portion, between the first and second flexible supporting portions; and at least one crotch belt guide on the crotch portion for guiding the crotch belt of the belt securing system.

20. The child carrier of claim 19, wherein the at least two belts are lap belts and the first and the second flexible supporting portions are moveable with the lap belts to encircle a child occupant area between inner facing surfaces of the back supporting portion and the first and the second flexible supporting portions.

21. The child carrier of claim 19, wherein the at least two belts are shoulder belts and the back supporting portion of the safety device portion comprises a back of head portion and wherein the first and the second flexible supporting portions are formed as cheek portions, the cheek portions protruding from the back of the head portion and creating a U-shaped member with the back of head portion, and the belt guides positioned on the undersides of the cheek portions.

* * * * *